United States Patent [19]

Murakami

[11] 3,902,380
[45] Sept. 2, 1975

[54] FLUID PRESSURE CONTROL IN AUTOMATIC SPEED-CHANGER

[75] Inventor: Noboru Murakami, Nagoya, Japan
[73] Assignee: Aisin Seiki Kabushiki Kaisha, Japan
[22] Filed: Jan. 16, 1973
[21] Appl. No.: 324,174

[30] Foreign Application Priority Data
Jan. 19, 1972  Japan.............................. 47-007472

[52] U.S. Cl. .................. 74/868; 74/753; 74/DIG. 1
[51] Int. Cl............................................. B60k 21/00
[58] Field of Search ............ 74/858, 753, 868, 869, 74/863, 864, DIG. 1

[56] References Cited
UNITED STATES PATENTS

| | | | |
|---|---|---|---|
| 2,711,656 | 6/1955 | Smirl................................ | 74/868 X |
| 2,769,350 | 11/1956 | Lucia et al...................... | 74/DIG. 1 |
| 3,025,717 | 3/1962 | Christenson.................... | 74/DIG. 1 |
| 3,073,179 | 1/1963 | Christenson.......................... | 74/645 |
| 3,138,969 | 6/1964 | Fisher et al...................... | 74/DIG. 1 |
| 3,699,994 | 10/1972 | Mohri.................................. | 74/863 |

Primary Examiner—Samuel Scott
Assistant Examiner—John Reep
Attorney, Agent, or Firm—Stevens, Davis, Miller & Mosher

[57] ABSTRACT

An improved method, and device for controlling fluid pressure in an automatic speed-changer including first and second friction engagement means for establishing a low-speed driving ratio and a high-speed driving ratio, respectively, and means for regulating the line pressure in a manner such that a low line pressure is delivered therefrom while the first and the second friction engagement means are switched therebetween, the improvement wherein the delivery of the low line pressure from the line pressure regulating means is caused to occur only after a fluid pressure supplied to the friction engagement means to be newly operated has reached a predetermined value, and the line pressure is again elevated to a value sufficient to assure the engagement thereof when the fluid pressure exceeds a second predetermined value.

4 Claims, 3 Drawing Figures

FLUID PRESSURE CONTROL IN AUTOMATIC SPEED-CHANGER

BACKGROUND

This invention relates generally to hydraulic systems and to automatic speed-changing devices. More particularly the invention relates to control of hydraulic fluid pressure in automatic speed-changing devices.

Fluid-type torque converters and fluid couplings in combination with gear transmission mechanisms have heretofore been generally known and used as automatic transmissions for motor vehicles to obtain a number of forward spaced ratios and one reverse ratio. While a number of methods are known for controlling the meshing of the gear transmission mechanisms, there are those wherein a plurality of speed change ratios are completed in the gear transmission mechanism through utilization of hydraulic pressure. Of these, the most generally used method is that wherein one or more hydraulic clutches and one or more hydraulic brakes are selectively combined and controlled by engaging or releasing the same.

In order to establish a plurality of stages of motive power transmitting trains in the automatic transmission at this time, it is necessary to operate by changing over in succession a plurality of friction engagement means actuatable by hydraulic pressure. If, at this changing over time, the friction engagement means for establishing both of the speed-change stages are operated, the entire gear mechanism mentioned above will lock, and a large impact similar to that at the time of sudden braking occurs.

Furthermore, if the friction engagement means for establishing both speed-change stages are released together, the vehicle speed does not rise with the rise in engine rotational speed even when the accelerator pedal is depressed and the engine is increased. Consequently, not only will the driver feel an unpleasant sensation of a slippage, but malfunctioning such as overspeeding of the engine will occur. Accordingly, at the time of changing the speed-change stage or ratio, the control of the changing timing or the two friction engagment means becomes important.

In order to carry out this control of the timing of changeover, there has been invented a method which comprises, in the time interval from the start of the changing over at the time of speed changing to the time when the engagement force of the friction engagement means to be released decreases to the specified engagement force, the steps of causing the regulating pressure of the hydraulic pressure regulator valve (hereinafter referred to as "regulator valve") to decrease temporarily, temporarily lowering the proportion of increase of the engagement force of the friction engagment means to be newly engaged, reducing also the engagement force of the friction engagement means to be reduced, causing both to slide quickly into engagement, and raising the regulation pressure of the above mentioned regulator valve in order to increase the engaging force by raising the hydraulic pressure to the friction engagement means to be newly engaged after the friction engagement means to be released has slid into engagement thereby to lessen the shock of speed changing.

While a good speed-changing sensation can be felt at the time of changing speeds by this method, if the line pressure is lowered simultaneously with the speed changing, the hydraulic pressure rise time up to the start of engaging of the friction engagement means to be newly engaged will be lengthened, whereby the time required for speed changing will be prolonged by that much.

SUMMARY

It is an object of this invention to provide a new and advanced fluid pressure controlling method whereby all of the above described conventional methods can be substantially eliminated.

Another object of this invention is to provide a new and advanced fluid pressure controlling device whereby all of the above described difficulties can be substantially overcome.

These and other objects of the inveniton can be achieved by an improved fluid pressure controlling method in an automatic speed-changing system for a vehicle, including a first friction engagement means for establishing at least a low-speed driving ratio, a second friction engagment means for establishing a high-speed driving ratio, and line pressure regulating means which is so controlled that a low line pressure is delivered therefrom when the system is operated in changing over from one of the friction engagement means to the other, the improvement comprising steps of reducing temporarily the line pressure delivered from the pressure regulating means just after a fluid pressure supplying the other friction engagement means to be newly engaged has attained a predetermined value, and elevating the line pressure to a valve sufficient to assure the engagement of the other friction engagement means when the fluid pressure supplying the friction engagement means exceeds a second predetermined value higher than the first predetermined value.

In another aspect thereof, the invention is directed toward the provision of an improved and advanced device for controlling fluid pressure in a fluid type automatic speed-changing system for a vehicle which device includes a first friction engagement means for establishing at least a low-speed driving ratio and a second friction engagement means for establishing at least a high-speed driving ratio, and a line pressure regulating means so constructed that a low line pressure is delivered when the system is operated in changing over from one of the friction engagement means to the other, the improvement comprising means for lowering temporarily the line pressure only after a fluid pressure supplying the other friction engagement means has attained a predetermined value, and means for elevating thereafter the line pressure to a value sufficient to assure the engagement of the other engagement means when the fluid pressure exceeds a second predetermined value higher than the first predetermined value.

The nature, principle, and utility of this invention will be more clearly apparent from the following detailed description with respect to examples of a preferred embodiment of the invention when read in conjunction with the accompanying drawings, in which like parts are designated by like reference numerals.

DRAWINGS

DETAILED DESCRIPTION

Figure 1:
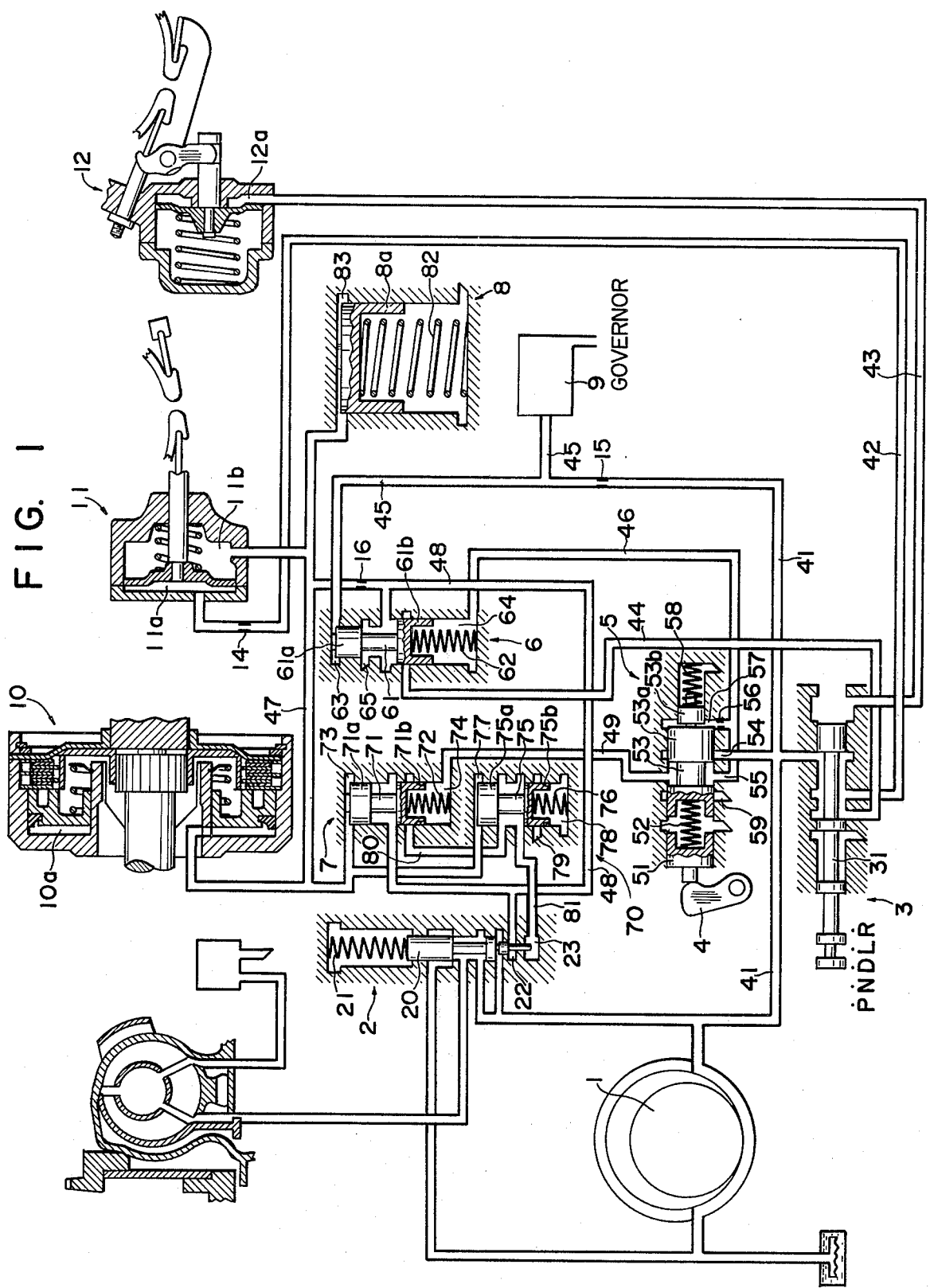
FIG. 1 is a hydraulic schematic diagram illustrating one example of a hydraulic system according to this invention for a speed-changing mechanism.

Referring first to FIG. 1, the hydraulic system shown therein is adapted for operation in conjunction with a speed-changing mechanism, which, in the example given, is the transmission of an automobile chosen for the purpose of illustration. This hydraulic system is supplied with hydraulic pressure by a hydraulic pump 1 driven by the engine (not shown) of the automobile to deliver hydraulic fluid under pressure to a hydraulic pressure control circuit as described below. The pressurized fluid from the hydraulic pump 1 is adjusted to a substantially constant pressure by a regulator valve 2, which is provided with first and second pressure-reducing chambers 22 and 23 for lowering the regulation pressure of the regulator valve 2.

The hydraulic pressure regulated by the regulator valve 2 (hereinafter referred to as the line pressure) is transmitted through a line-pressure line 41 to a manually operated shift valve 3, a throttle regulator valve (hereinafter called the throttle valve) 5, and a speed regulating valve (hereinafter called the governor) 9. The shift valve 3 can be manually operated to impart the line pressure within the line 41 regulated by the regulator valve 2 selectively to friction engagement means 10, 11, and 12 by way of fluid paths 43, 43, and 44 thereby to establish different driving ratios in the gear trains within the transmission.

The throttle valve 5 is coupled to the accelerator pedal (not shown) of the automobile and has a throttle lever 4 adapted to push a down-shift slider or plug 51 in the axial direction (to the right as viewed in FIG. 1) when the accelerator pedal is depressed. As a consequence, a spring 52 is compressed, and a spool valve 53 is pushed toward the right to open a port 54 communicating with the above mentioned line-pressure line 41.

The line pressure which has entered throttle valve 5 through the port 54 passes from the port 55 through an orifice 56 to enter a port 57. The line pressure is regulated to a throttle pressure proportional to the degree of opening of the engine throttle valve by the forces of the spring 52 and a spring 58 acting counter thereto and the hydraulic pressure exerted on the area difference between two expanded parts or piston parts 53a and 53b of different diameter of the valve 53. The throttle valve 5 is further provided with a drain port 59. The fluid passage between the port 55 and the orifice 56 communicates with a fluid path 46 to a 1-2 shift valve 6 described hereinafter.

The aforementioned line-pressure line 41 communicates with the governor 9 by way of an orifice 15 and a fluid path 45. The governor 9 causes a hydraulic pressure, hereinafter referred to as the governor pressure, varying in response to the vehicle speed to be generated within the fluid path 45.

The manually operated shift valve 3 communicates by the fluid path 43 with a servo chamber 12a of a second brake device 12 for establishing reverse drive in the transmission. The shift valve 3 is further communicated by the fluid path 42 with a supply chamber 11a of a first brake device 11 for establishing the first forward speed in the transmission and by the fluid path 44 with the 1-2 shift valve 6 for changing between first and second forward speeds briefly mentioned above. Thus, the line 41 providing the line pressure is connected selectively to the fluid paths 42, 43, and 44 in accordance with the shift position of this manually operated shift valve 3.

The 1-2 shift valve 6 has a valve 61 provided with an expanded part or piston part 61a of relatively small diameter and a piston part 61b of relatively large diameter fixed coaxially to a common stem in a mutually spaced-apart arrangement and a compression spring 62 disposed within a cylinder chamber 64 and urging the valve 61 upward as viewed in FIG. 1. The cylinder chamber 64 at its lower end communicates with the aforementioned fluid path 46 which applies the aforementioned throttle pressure to the lower side of the large-diameter piston part 61b thereby to push the valve 61 upward.

The above mentioned fluid path 45 is connected to a chamber 63 at the upper end of the 1-2 shift valve 6 and applies the aforementioned governor pressure to the small-diameter piston part 61a thereby to push the valve 61 downward against the combined upward force due to the throttle pressure and the spring 62.

The above mentioned fluid path 44 is connected to approximately the middle part of the 1-2 shift valve 6. The port of this fluid path 44 is closed by the large-diameter spool 61b when the governor pressure is low, and the valve 61 is in its upper position as indicated in FIG. 1. When the governor pressure rises, and the valve 61 is forced downward to its lower position, this fluid path 44 is communicated by way of the space between the larger-diameter piston part 61b and the smaller-diameter piston part 61a of the valve 61 with a fluid path 47 connecting the 1-2 shift valve 6 to a supply chamber 10a of a first clutch 10 of the aforementioned friction engagement means, a release chamber 11b of a first brake 11 of the same friction engagement means, an accumulator chamber 83 of an accumulator 8, and chambers 73 and 77 at the upper ends of first and second pressure-reducing valves 7 and 70.

At a point in the fluid path 47 between the point where it is branched to the above mentioned chambers 10a, 11b, 83, 73, and 72 and the 1-2 shift valve 6, there is inserted an orifice 16. The part of the fluid path 47 between this orifice 16 and the 1-2 shift valve 6 communicates with a branch fluid path 48 connected to the middle part of the first pressure-reducing valve 7 and also to the first pressure-reducing chamber 22 of the aforementioned regulator valve 2.

The first pressure-reducing valve 7 has a first valve 71 having piston parts 71a and 71b of equal diameter and a first spring 72 urging the first valve 71 upward as viewed in FIG. 1. The aforementioned first chamber 73 is formed above the piston part 71a of the first valve 71 and communicates with the fluid path 47. Below the lower piston part 71b of the first valve 71, there is formed a second chamber 74, to which a fluid path 49 is connected to supply thereto the throttle pressure from the throttle valve 5.

The above mentioned second pressure-reducing valve 70 has a second valve 75 having piston parts 75a and 75b of equal diameter and a second spring 76 urging the valve 75 upward as viewed in FIG. 1. Above the piston part 75a of this valve, there is formed a third chamber 77, which communicates with the aforementioned fluid path 47. Below the piston part 75b, there is formed a fourth chamber 78, which is communicatively opened to a fluid sump.

A fluid path 80 is connected at one end thereof to the first pressure-reducing valve 7 at a point thereof somewhat below the middle part where the port of this fluid path 80 into the valve cylinder is normally closed by the lower piston part 71b but communicates with the aforementioned fluid path 48 when the pressure within the first chamber increases and displaces the valve 71 downward. The fluid path 80 is connected at its other end to the middle part of the valve cylinder of the second pressure-reducing valve 70 and there normally communicates with one end of a fluid path 81 by way of the space between the piston parts 75a and 75b of the second valve 75. When this second valve 75 is displaced downward by the hydraulic pressure within the third chamber 77, the port of the fluid path 80 into the valve cylinder is closed by piston part 75a. The other end of the fluid path 81 is connected to the previously mentioned second pressure-reducing chamber 23 of the regulator valve 2.

The second pressure-reducing valve 70 is provided at its lower part with a discharge port 79 so positioned that it is normally closed by the piston part 75b and communicates with the fluid path 81 when the second valve 75 is in its downwardly displaced position. This discharge port 79 communicates on its discharge side with a fluid sump.

The aforementioned accumulator 8 comprises, essentially, an accumulator cylinder, an accumulator piston 8a slidably disposed within the cylinder, and a spring 82 urging the piston 8a toward the aforementioned accumulator chamber 83 at the head of the cylinder. This accumulator 8 functions to prevent sudden rise in the pressure of the hydraulic fluid entering the accumulator chamber 83 thereby to restrict the rate of rise of the hydraulic pressure in the supply chamber 10a of the clutch 10 and the release chamber 11b of the first brake 11.

The hydraulic system of the above described example organization according to this invention operates in the following manner.

In FIG. 1, the selector valve 31 of the manually operated shift valve 3 is indicated as being in its position D. When this valve 31 is in its position P (parking) or position N (neutral), the shift valve 3 shuts off the line pressure supply line 41, and the line pressure is not supplied to the fluid paths 44, 42, and 43 communicating with the friction engagement means comprising the clutch 10, the first brake 11, and the second brake 12. Consequently, these friction engagement members are not in engaged state, and the transmission does not transmit motive power.

When the selector valve 31 of the shift valve 3 is shifted to its position L, the line-pressure line 41 communicates with only the fluid path 42, and the line pressure is transmitted by way of an orifice 14 provided in the fluid path 42 to the supply chamber 11a of the first brake 11. Accordingly, the first brake 11 is caused to engage in a smooth manner by a hydraulic pressure which, being subjected to a time delay due to the orifice 14, rises gradually. The line pressure at this time is the maximum line pressure regulated by the regulator valve 2 (hereinafter called the high line pressure) since hydraulic pressure is not being supplied to the pressure-reducing chambers 22 and 23 of the regulator valve 2. When the first brake 11 engages, the transmission assumes the first forward speed state and transmits motive power.

Then, when the selector valve 31 is shifted to its position D (i.e., the position indicated in FIG. 1), the line-pressure line 41 communicates with the fluid paths 42 and 44. The line pressure introduced into the fluid path 42 functions in the same manner as in the case where the selector valve 31 is in the position L. The line pressure introduced into the fluid path 44 is supplied to the 1–2 shift valve 6, but while the vehicle speed is low, and the downward force due to the governor pressure within the chamber 63 is still insufficient to overpower the upward force due to the spring 62 and the throttle pressure within the chamber 64, this line pressure is being shut off by the larger-diameter piston part 61b of the valve 61. Accordingly, the operation at this time is the same as that of the above described position L.

Then, when the vehicle speed increases, and the force due to the governor pressure within the chamber 63 exceeds the force due to the throttle pressure within the chamber 64 and the spring 62 to displace the valve 61 downward, the fluid path 44 communicates through the space between the piston parts 61a and 61b of the valve 61 with the fluid path 47, whereby the line pressure is introduced into the fluid paths 47 and 48.

The line pressure thus introduced into the fluid path 48 is supplied to the first pressure-reducing chamber 22 of the regulator valve 2 and, at the same time, to the pressure-reducing valve 7. The line pressure thus supplied to the pressure-reducing valve 7 is shut off in the space between the piston parts 71a and 71b of the valve 71. For this reason, the line pressure at this time is an intermediate pressure, hereinafter referred to as medium line pressure, which is lower than the above mentioned high line pressure since the line pressure is being applied to the first pressure-reducing chamber 22 of the regulator valve 2.

Thereafter, as the hydraulic pressure within the fluid path 47, regulated by the orifice 16 and the accumulator 8, rises gradually, it first overpowers the spring 72 and the throttle pressure within the second chamber 74 and displaces the first valve 71 downward as viewed in FIG. 1, thereby establishing communication between the fluid paths 48 and 80. At this time, the second valve 75 is held in the position indicated in FIG. 1 by the spring 75. Accordingly, the line pressure transmitted into the fluid path 80 is transmitted by way of the space between the two piston parts 75a and 75b of the second valve 75 and the fluid path 81 to the interior of the second pressure-reducing chamber 23 of the regulator valve 2 and, operating cooperatively with the line pressure within the first pressure-reducing chamber 22, causes the line pressure regulated by the regulator valve 2 to become its lowest line pressure, hereinafter called the low line pressure.

At this time, the line pressure of the entire hydraulic system becomes the low line pressure, lowering the engagement pressure of the first brake 11 which has been engaged up to that time, and it becomes possible to place this brake early in a sliding engagement state. For this reason, the line pressure introduced into the fluid path 48 also immediately becomes the low line pressure, and this pressure is introduced by way of the first orifice 16 into the supply chamber 10a of the clutch 10, the release chamber 11b of the first brake 11, the first chamber 73 of the first pressure-reducing valve 7, and the third chamber 77 of the second pressure-reducing valve 70. At the same time, this pressure is introduced also into the accumulator chamber 83 of the accumulator 8, which thereby operates to control suitably the rate of rise or lowering of the hydraulic pressure in the above mentioned chambers 10a, 11b, and 73.

When the hydraulic pressure in the supply chamber 10a of the first clutch 10 rises, thereby causing the clutch 10 to start to slip, a fluid pressure equivalent to that introduced into the supply chamber 10a of the clutch 10 is further introduced into the release chamber 11b of the first brake 11, whereby slip is also caused in the first brake 11. At this time, a fluid pressure equivalent to that introduced into the supply chamber 10a of the clutch 10 is supplied to the third chamber 77 of the second pressure reducing valve 70, thereby applying a force for shifting the valve 75 downwardly, as viewed in FIG. 1, against the upward force of the spring 76.

As a result, the fluid path 80 is interrupted by the piston part 75a of the valve 75, and the fluid path 81 communicates with the discharge port 79 further connected to the fluid sump. Thus, the fluid pressure in the second pressure-reducing chamber 23 in the regulator valve 2 is released when the fluid pressure in the third chamber 77 of the pressure-reducing valve 70 exceeds a predetermined value. Releasing of the fluid pressure in the second pressure-reducing chamber 23 of the regulator valve 2 causes the fluid pressure in the line-pressure line to be elevated to the medium line pressure, which is lower than the above mentioned high line pressure but is higher than the low line pressure.

Accordingly, the clutch 10 is brought into the engaging state, and the first brake 11 of the friction engagement means is disengaged, thus setting the speed-changing mechanism at the second forward speed (normal running speed) of the vehicle.

In any of the cases where the accelerator pedal is depressed excessively, as in the case of "kick down" mode of operation, thereby to elevate the throttle pressure to the line pressure at that time thus causing the valve stem 61 of the 1–2 shift valve 6 to be pushed back upwardly as viewed in FIG. 1, where the vehicle speed decreases thus lowering the governor pressure in the chamber 63 of the 1–2 shift valve 6 to a point where the pressure in the chamber 63 is overcome by the upward force caused by the spring 62 and the throttle pressure in the chamber 64, whereby the valve stem 61 of the 1–2 shift valve 6 is shifted upwardly thus causing an automatic shiftdown of the speed changing mechanism, and where the shift valve 3 is manually shifted from the position D to the position L, the upwardly shifted valve stem 61 of the 1–2 shift valve 6 causes the paths 47 and 48 to communicate with the discharge port 65.

As a result, the fluid pressure in the paths 48, 80, and 81 are lowered instantaneously, and the fluid pressure in the path 47 is lowered gradually because of the existence of the orifice 16. Thus, the line pressure regulated by the regulator valve 2 is elevated to the high line pressure, and the engaging force of the first brake 11 is strengthened in accordance with the gradual lowering of the fluid pressure in the release chamber 11b, whereby the clutch 10 is disengaged and the first brake 11 is engaged, and the vehicle speed is lowered to the first forward speed.

In the case where the selector valve 31 of the manual shift valve 3 is shifted to the position R, the line-pressure line 41 communicates with the path 43, whereby the second brake 12 is brought into engagement, and the rearward driving of the vehicle is thereby attained.

A modification of a principal component of this invention will now be described with reference to FIG. 2 wherein like parts are designated by like reference numerals.

The modification differs from the example shown in FIG. 1 in that the communication between the fluid path 48 and the first pressure-reducing chamber 22 in FIG. 1 is disconnected, and the fluid path 80 is connected with the first pressure-reducing chamber 22.

Figure 2:
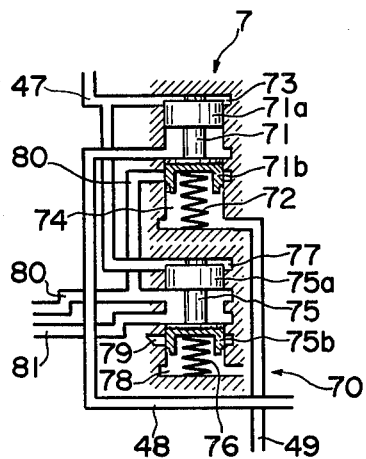
FIG. 2 is a fragmentary, hydraulic schematic diagram showing another example of an essential part of the hydraulic system of the invention.

Because of the above described modification, the high line pressure is maintained for a period after the vehicle speed has changed to the second forward speed, and when the pressure in the first chamber 73 of the first pressure reducing valve 7, which is equal to the fluid pressures in the supply chamber 10a of the first clutch 10 and the release chamber 11b of the first brake 11, overcomes the trottle pressure and upwardly acting first spring 72 in the second chamber 74 of the first pressure-reducing valve 7, the first valve 71 is displaced downwardly as viewed in FIG. 2. Thus, the line pressure in the fluid path 48 is introduced into the first and the second pressure-reducing chambers 22 and 23 of the regulator valve 2, whereby the line pressure in the line 41 is regulated to the low line pressure.

When the fluid pressure in the third chamber 77 of the second pressure-reducing valve 70, which is equal to the pressures in the supply chamber 10a of the clutch 10 and in the release chamber 11b of the first brake 11, exceeds a predetermined value overcoming the second spring 76, which corresponds to a pressure terminating the slipping engagement of the clutch 10, the second valve 75 is displaced downward as viewed in FIG. 2, whereby the communication between the fluid paths 80 and 81 is interrupted, and the fluid path 81 communicates with the discharge port 79. Thus, the pressure in the second pressure-reducing chamber 23 of the regulator valve 2 is released, and the line pressure in the fluid path 41 is elevated to the intermediate pressure, thus operating the clutch 10 into a completely engaged state.

In contrast to the example shown in FIG. 1, wherein, when the speed ratio is changed to forward second speed, the line pressure is varied from the medium line pressure to the low line pressure and again to the medium line pressure, the modified example shown in FIG. 2 changes the line pressure from the high line pressure to the low line pressure, and then to the medium line pressure.

Figure 3:
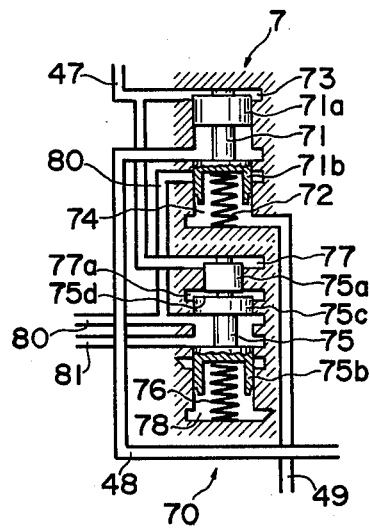
FIG. 3 is a fragmentary, hydraulic schematic diagram showing a modification of the part shown in FIG. 2.

In FIG. 3, there is shown another modification wherein the second pressure-reducing valve 70 is modified in such a manner that the diameter of the piston part 75a of the second valve 75 is made smaller than that of the other piston part 75b, and another piston part 75c having a diameter equal to that of the piston part 75b is provided on the second valve 75 at a position between the piston parts 75a and 75b. A fifth chamber 77a is thus formed on the upper side of the piston part 75c, as viewed in FIG. 3, and an orifice 75d is further provided through the piston part 75c for communicating the space between the piston parts 75c and 75b to the fifth chamber 77a.

When the first valve 71 is displaced downwardly thereby communicating the fluid path 48 to the fluid path 80, the hydraulic pressure in the fluid path 81, that is, the pressure within the second pressure-reducing chamber 23 of the regulator valve 2, is regulated by the hydraulic pressures within the fifth chamber 77a and the third chamber 77 and the force of the second spring 76 acting thereagainst in such a manner that the hydraulic pressure in the second pressure-reducing chamber 23 is gradually reduced in response to the elevation of the hydraulic pressure in the third chamber 77, whereby the line pressure is gradually elevated by the regulator valve 2.

The hydraulic pressure adjusting operation of the second pressure-reducing valve 70 is continued until the pressure in the third chamber 77 is elevated to a value such that the pressure in the third chamber 77 acting independently overcomes the upward force of the second spring 76. In other words, the line pressure during the operation of the pressure-reducing valves 7 and 70 shown in FIG. 3 is varied from the high line pressure to the low line pressure, and then gradually elevated to the medium line pressure. Those parts shown in FIG. 3 which are the same as or equivalent to parts in the example shown in FIG. 2 are designated by like reference numerals.

As will be apparent from the foregoing description, the line pressure in this hydraulic system is temporarily lowered when the pressure of the fluid supplied to one of the friction engagement means to be newly engaged exceeds a predetermined value during the operation of the speed-changing device, and, after the hydraulic pressure supplied to the friction engagement means reaches a predetermined value higher than the above-mentioned predetermined value, the line pressure is elevated to a sufficiently high value required for keeping the friction engagement means in their engaged states.

Accordingly, the diameters of the orifices in various parts of the hydraulic system may be made greater than those of the conventional devices, whereby the machining of these orifices requires a lower degree of precision than orifices of small diameter. Accordingly, the machining is facilitated and made inexpensive.

Furthermore, the capacities of the accumulator and the modulator valves can be made smaller than those of the conventional devices, and the manufacture and design thereof are much more facilitated.

In addition, because the hydraulic force acting in one of the friction engagement means to be released is suitably lowered as a result of the temporary lowering of the line pressure, the friction engagement means to be released can be shifted promptly to the torque mode of operation with the engagement means kept in the slipping states, whereby the speed-changing operation therewith can be carried out in a short period without shock.

When the hydraulic pressure in one of the friction engagement means to be newly engaged exceeds a predetermined value, that pressure is utilized as a signal for initiating the temporary lowering of the line pressure, and none of the transfer signals occurring at an instant of speed change is used as the initiating signal. Therefore, the pressure in the supply chamber of the friction engagement means is gradually elevated only while the friction engagement means is operated in the slipping engagement. Thus, the change-over of the vehicle speed is carried out in a period, other than the above described period, during which the line pressure is comparatively high, and whereby the speed-changing period can be substantially shortened.

I claim:

1. In a fluid pressure controlling device to be used in a fluid type automatic speed-changing system in a vehicle including a first friction engagement means for establishing at least a low-speed driving ratio in a first gear train interposed between an input shaft and an output shaft of the vehicle, and a second friction engagement means for establishing at least a high-speed driving ratio in a second gear train disposed alike the first gear train, an improvement comprising:
   1. a pressurized fluid source;
   2. a regulator valve communicatively connected to said fluid source for regulating the line pressure supplied to said system, said regulator valve having a first pressure reducing chamber and a second pressure reducing chamber;
   3. first and second passage means for applying output pressure from said regulator valve to said first and second friction engaging means;
   4. changeover means provided in said first and second passage means;
   5. pressure-drop means provided in said second passage means extended between said changeover means and one of said friction engagement means;
   6. by-pass means branched from said second passage means at an intermediate section between said changeover means and said pressure-drop means, and connected to said first pressure reducing chamber of said regulator valve; and
   7. pressure reducing valve means provided in said second passage means at an intermediate section between said one of the friction engagement means and said pressure-drop means, said pressure reducing valve means being operated in a manner such that when the fluid pressure operating one of said friction engagement means reaches a first predetermined pressure, a third passage means connecting said by-pass means to said second pressure reducing chamber of said regulator valve is thereby opened, and, when said fluid pressure operating one of said friction engagement means reaches a second predetermined pressure, said third passage means is closed and the fluid pressure in said second pressure reducing chamber is thereby drained to a sump.

2. In a fluid pressure controlling device to be used in a fluid type automatic speed-changing system in a vehicle including a first friction engagement means for establishing at least a low-speed driving ratio in a first gear train interposed between an input shaft and an output shaft of the vehicle, and a second friction engagement means for establishing at least a high-speed driving ratio in a second gear train disposed alike the first gear train, an improvement comprising:
   1. a pressurized fluid source;
   2. a regulator valve communicatively connected to said fluid source for regulating the line pressure supplied to said system, said regulator valve having a first pressure reducing chamber and a second pressure reducing chamber;
   3. first and second passage means for applying output pressure from said regulator valve to said first and second friction engaging means;
   4. changeover means provided in said first and second passage means;
   5. pressure-drop means provided in said second passage means extended between said changeover means and one of said friction engagement means;
6. by-pass means branched from said second passage means at an intermediate section between said changeover means and said pressure-drop means, and connected to said first and second pressure reducing chambers of said regulator valve; and
7. pressure reducing valve means provided in said second passage means at an intermediate section between said one of the friction engagement means and said pressure drop means, said pressure reducing valve means being operated in a manner such that, when the fluid pressure operating one of said friction engagement means reaches a first predetermined value, the output pressure of said changeover valve means is introduced into both of said pressure reducing chambers of said regulator valve, and, when the fluid pressure operating one of said friction engagement means reaches a second predetermined value, the fluid in said second pressure reducing chamber is drained to a sump.

3. A device as set forth in claim 2 wherein said pressure reducing valve means comprise a first valve for opening said by-pass means when the fluid pressure in one of said friction engagement means reaches said first predetermined value, and a second valve for draining fluid in said second pressure reducing chamber of said regulator valve when the fluid pressure in one of said friction engagement means reaches said second predetermined value.

4. A device as set forth in claim 3 wherein said second valve comprises a valve casing and a spool-shaped valve body having a small diameter piston part and first and second piston parts of a greater diameter and slidable in said valve casing under the action of a bias spring, thus forming a first chamber communicating with one of said friction engagement means between said piston part of a smaller diameter and the end wall of said valve casing, a second chamber between said piston part of the smaller diameter and said first piston part of the greater diameter, and a third chamber between both piston parts of the greater diameter, and wherein an orifice is further provided through said first piston part of the greater diameter for communicating said second chamber and said third chamber.

* * * * *